United States Patent
Ban et al.

(10) Patent No.: US 9,055,498 B2
(45) Date of Patent: Jun. 9, 2015

(54) HANDOVER IN LONG TERM EVOLUTION NETWORK

(75) Inventors: Tae-Won Ban, Gyeonggi-do (KR); Chang-Yong Ahn, Gyeonggi-do (KR); Sung-Sang You, Seoul (KR); Hyun-Beom Lee, Seoul (KR); Hee-Jun Lee, Seoul (KR); Byoung-Jin Choi, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 172 days.

(21) Appl. No.: 13/553,160

(22) Filed: Jul. 19, 2012

(65) Prior Publication Data

US 2013/0034081 A1 Feb. 7, 2013

(51) Int. Cl.
*H04W 4/00* (2009.01)
*H04W 36/16* (2009.01)
*H04W 36/00* (2009.01)

(52) U.S. Cl.
CPC .......... *H04W 36/16* (2013.01); *H04W 36/0061* (2013.01)

(58) Field of Classification Search
CPC .............................. H04W 48/18; H04W 36/16
USPC ........................................................ 370/331
See application file for complete search history.

(56) References Cited

U.S. PATENT DOCUMENTS

| | | | |
|---|---|---|---|
| 7,145,890 B1 | 12/2006 | Seo et al. | |
| 7,596,181 B2 | 9/2009 | Chang et al. | |
| 8,248,911 B2 | 8/2012 | Kim et al. | |
| 2006/0013325 A1 | 1/2006 | Agrawal et al. | |
| 2007/0097938 A1 | 5/2007 | Nylander et al. | |
| 2007/0254620 A1* | 11/2007 | Lindqvist et al. | 455/403 |
| 2008/0146226 A1 | 6/2008 | Claussen et al. | |
| 2009/0181672 A1 | 7/2009 | Horn et al. | |
| 2009/0182871 A1 | 7/2009 | Gupta et al. | |
| 2009/0239533 A1* | 9/2009 | Somasundaram et al. | 455/434 |
| 2009/0290652 A1 | 11/2009 | Rezaiifar et al. | |
| 2010/0069062 A1 | 3/2010 | Horn et al. | |
| 2010/0124179 A1* | 5/2010 | Lee et al. | 370/252 |
| 2010/0210288 A1 | 8/2010 | Kim et al. | |

(Continued)

FOREIGN PATENT DOCUMENTS

| | | |
|---|---|---|
| JP | 2009-077368 A | 4/2009 |
| JP | 2011-087294 A | 4/2011 |

(Continued)

OTHER PUBLICATIONS

Poongup Lee et al., Physical cell identity reservation for 3GPP LTE femtocell, Jan. 10-14, 2010, Suwon, S.Korea, entire document.*

*Primary Examiner* — Mark Rinehart
*Assistant Examiner* — Maharishi Khirodhar
(74) *Attorney, Agent, or Firm* — IP Legal Services, LLC

(57) ABSTRACT

Described embodiments provide for handover in a long term evolution (LTE) communication network. A LTE macrocell base station may receive a measurement report from user equipment while providing a communication service to the user equipment located within a service area of the LTE macrocell base station, and determine whether or not the neighbor cell is a LTE macrocell or a LTE femtocell based on the measurement report. The LTE macrocell base station may initiate hand-over of the user equipment to a neighbor WCDMA macrocell base station when the neighbor cell is determined as the LTE femtocell.

19 Claims, 5 Drawing Sheets

(56) References Cited

U.S. PATENT DOCUMENTS

| | | |
|---|---|---|
| 2010/0227627 A1 | 9/2010 | Ishii et al. |
| 2011/0014920 A1 | 1/2011 | Nylander et al. |
| 2011/0143755 A1* | 6/2011 | Islam et al. .................... 455/434 |
| 2011/0149771 A1 | 6/2011 | Abeta et al. |
| 2011/0190010 A1 | 8/2011 | Cho |
| 2011/0300870 A1 | 12/2011 | Chun et al. |
| 2012/0039226 A1* | 2/2012 | Yang et al. .................... 370/311 |

FOREIGN PATENT DOCUMENTS

| | | | |
|---|---|---|---|
| KR | 10-2001-0017137 | A | 3/2001 |
| KR | 10-2006-0051391 | A | 5/2006 |
| KR | 10-2007-0050339 | A | 5/2007 |
| KR | 10-2008-0085321 | A | 9/2008 |
| KR | 10-2009-0099058 | A | 9/2009 |
| KR | 10-2010-0009932 | A | 1/2010 |
| KR | 10-2010-0016881 | A | 2/2010 |
| KR | 10-2010-0018309 | A | 2/2010 |
| KR | 10-2010-0046492 | A | 5/2010 |
| KR | 10-2010-0092855 | A | 8/2010 |
| KR | 10-2010-0096015 | A | 9/2010 |
| KR | 10-2010-0123078 | A | 11/2010 |
| KR | 10-2010-0129315 | A | 12/2010 |
| KR | 10-2010-0132845 | A | 12/2010 |
| KR | 10-2011-0010121 | A | 1/2011 |
| KR | 10-2011-0088673 | A | 8/2011 |
| KR | 10-2012-0034217 | A | 4/2012 |

* cited by examiner

HANDOVER IN LONG TERM EVOLUTION NETWORK

CROSS REFERENCE TO PRIOR APPLICATIONS

The present application claims priority tinder 35 U.S.C. §119 to Korean Patent Application No. 10-2011-0071535 (filed on Jul. 19, 2011), which is hereby incorporated by reference in its entirety.

FIELD OF THE INVENTION

The present invention relates to communication and, in particular, to handover in a long term evolution (LTE) network.

BACKGROUND OF THE INVENTION

Long term evolution (LTE) may denote the fourth generation (4G) communication technology. LTE has been developed for increasing a data transmission rate, for efficiently using radio resources such as allocated frequencies, for improving mobility, for reducing communication latency, for optimizing packet data transmission, and for guaranteeing a service quality level. Lately, LTE communication networks have been commercialized in various countries in Asia, North America, and Europe. The LTE communication network has been implemented over existing $3^{rd}$ generation (3G) communication networks, for example, wideband code division multiple access (WCDMA) communication networks. Accordingly, the LTE communication network may co-exist with a WCDMA communication network. The LTE communication network, however, may be available only in certain areas. For example, the LTE communication network is only available for certain regions in South Korea. The LTE communication network has not been expanded to cover the entire country of South Korea.

The LTE communication network may include a plurality of LTE macrocells and LTE small cells. A LTE macrocell may provide a communication service in a comparatively wide area by a LTE macrocell base station. A LTE small cell may provide a LTE communication service in a comparatively small area by a LTE small cell base station. LTE small cells may include a LTE microcell, a LTE picocell, and a LTE femtocell. The LTE microcell may be used in a densely populated urban area. The LTE picocell may be for area even smaller than LTE microcells, such as a large office, a mall, or a train station. The LTE femtocell may provide a communication service in the smallest area compared to the LTE microcell and the LTE picocell. Such a LTE femtocell may be installed at a small office or home to provide a LTE communication service. Accordingly, LTE macrocells may overlap with a plurality of LTE small cells such as LTE microcells, LTE picocells, and LTE femtocells. Furthermore, the WCDMA communication network may include a plurality of WCDMA macrocells. A WCDMA macrocell may provide an associated communication service in a comparatively wide area by a WCDMA macrocell base station. As described above, the LTE communication network is built above the WCDMA communication network. Accordingly, LTE macrocells may overlap with WCDMA macrocells.

In a LTE communication network, the limited number of identification codes may be used for identifying each LTE base station. For example, about 504 physical cell identities (PCIs) may be used to identify LTE base stations in the LTE communication network. Since the number of PICs is limited, the PCIs may be required to be reused. In case of LTE macrocells, the reuse of PCIs may not cause a problem because a service area of each LTE macrocell is comparatively large and LTE macrocells are distributed over a comparatively wide area. In the case of LTE small cells, such as a LTE femtocell, the reuse of PCIs may cause a problem because a plurality of LTE small cell base stations may be installed in a comparatively small area. Accordingly; it may be difficult to identify each LTE small cell base station only with PCIs.

Due to such shortage in PCIs, user equipment may not be normally handed over from a LTE macrocell to a LTE small cell. For example, user equipment may frequently enter into a LTE femtocell from a LTE macrocell while the user equipment is receiving a LTE communication service from an associated LTE macrocell base station. In this case, the user equipment may not identify a LTE femtocell base station of the newly entered LTE femtocell. Accordingly, the user equipment cannot be handed over to the LTE femtocell base station. Such handover failure problem may lead frequency interference, service quality deterioration, power increment and cell capacity decrement in LTE macrocell base stations, and uplink coverage shrinkage in LTE femtocell base stations.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, handover may be controlled in a LTE communication network according to a type of a neighbor cell that user equipment enters.

In accordance with another aspect of the present invention, a macrocell base station may determine whether a base station of a neighbor cell that user equipment enters is a LTE macrocell base station or a LTE small cell base station based on a measurement report received from the user equipment.

In accordance with another aspect of the present invention, user equipment may be handed over to a WCDMA macrocell base station when the user equipment enters into a LTE small cell from a LTE macrocell.

In accordance with an exemplary embodiment of the present invention, a method may be provided for handover in a long teen evolution (LTE) communication network including LTE macrocells and LTE femtocells and overlapping with wideband code division multiple access (WCDMA) macrocells. The method in the LTE macrocell base station may include receiving a measurement report from user equipment while providing a communication service to the user equipment located within a service area of the LTE macrocell base station, determining whether or not the neighbor cell is a LTE macrocell or a LTE femtocell based on the measurement report, and handing over the user equipment to a neighbor WCDMA macrocell base station when the neighbor cell is determined as the LTE femtocell.

The determining may include determining whether the received measurement report includes a LTE macrocell identification code or a LTE femtocell identification code, determining that the neighbor cell is the LTE macrocell when the received measurement report is determined as including the LTE macrocell identification code, and determining that the neighbor cell is the LTE femtocell when the received measurement report is determined as including the LTE femtocell identification code.

The LTE macrocell identification code may be an identification code defined to be assigned only to a LTE macrocell base station. The LTE femtocell identification code may be an identification code defined to be assigned only to a LTE femtocell base station.

The method may further include handing over the user equipment to a neighbor LTE macrocell base station when the neighbor cell is determined as the LTE macrocell.

Prior to the receiving, the method may further include storing information on the LTE macrocell identification codes and the LTE femtocell identification codes in a memory and transmitting the stored information to the user equipment with a neighbor list through at least one of a broadcasting signal and a measurement control signal.

In accordance with another embodiment of the present invention, a method may be provided for handover in a long term evolution (LTE) communication network including LTE macrocell base stations and LTE femtocell base stations and overlapping with wideband code division multiple access (WCDMA) macrocell base stations. The method in a first LTE macrocell base station may include providing a communication service to user equipment located in a service area of the first LTE macrocell base station, receiving a measurement report from the user equipment when the user equipment enters a neighbor cell, determining a type of the neighbor cell based on the measurement report, and controlling handover of the user equipment based on the determination result.

The determining a type of the neighbor cell may include determining the type of the neighbor cell based on a physical cell identity (PCI) of the neighbor cell, which is included in the measurement report.

The determining a type of the neighbor cell may include determining that the type of the neighbor cell is a LTE macrocell base station when the measurement report includes a LTE macrocell base station PCI and determining that the type of the neighbor cell is a LTE femtocell base station when the measurement report includes a LTE femtocell base station PCI.

The LTE macrocell base station PCI may be one of PCIs included in a LTE macrocell PCI group and the LTE femtocell base station PCI may be one of PCIs included in a LTE femtocell PCI group.

PCIs may be grouped into the LTE macrocell PCI group and the LTE femtocell PCI group. PCIs of the LTE macrocell PCI group may be assigned only to LTE macrocell base stations. PCIs of the LTE femtocell PCI group may be assigned only to LTE femtocell base station.

The controlling handover may include handing over the user equipment to a second LTE macrocell base station when the type of the neighbor cell is determined as a LTE macrocell and handing over the user equipment to a WCDMA macrocell base station when the type of the neighbor cell is determined as a LTE femtocell.

The receiving a measurement report from the user equipment may include measuring, by the user equipment, signal intensity of the neighbor cell when the user equipment enters the neighbor cell, including, by the user equipment, a PCI of the neighbor cell into the measuring report with the measurement result, and transmitting, by the user equipment, the measurement report to the LTE macrocell base station.

The method may further include transmitting a neighbor list to the user equipment. The neighbor list may include information on a LTE macrocell PIC group and a LTE femtocell PCI group to the user equipment.

The neighbor list with the information may be transmitted to the user equipment through at least one of a broadcasting signal and a measurement control message.

In accordance with still another embodiment of the present invention, an apparatus may be provided for handover in a long term evolution (LTE) communication network. The apparatus may include a receiving module, a determination module, and a handover processor. The receiving module may be configured to receive a measurement report from user equipment while the user equipment receives a communication service from an associated LTE macrocell base station. The determination module may be configured to determine a type of a neighbor cell that the user equipment enters into. The handover processor may be configured to hand over the user equipment to one of a LTE macrocell base station or a WCDMA macrocell base station according to the determination result.

The receiving module may include a measurement control message transmitter and a measurement report receiver. The measurement control message transmitter may be configured to transmit a measurement control message to the user equipment. The measurement report receiver may be configured to receive the measurement report from the user equipment in response to the measurement control message.

The measurement control message may include a neighbor list that contains physical cell identities of neighbor cell base stations. The measurement control message transmitter may transmit the measurement control message with the neighbor list through a broadcasting signal.

The apparatus may further include a memory. The memory may be configured to store information on LTE macrocell PCIs and LTE femtocell PCIs. The LTE macrocell PCIs may be defined to be assigned only to LTE macrocell base stations and the LTE femtocell PCIs may be defined to be assigned only to LTE femtocell base station.

The determination module may be configured to determine the type of the neighbor cell is a LTE macrocell when the measurement report includes a LTE macrocell PCI and to determine the type of the neighbor cell is a LTE femtocell when the measurement report includes a LTE femtocell PCI.

The handover processor may be configured to hand over the user equipment to a neighbor LTE macrocell base station when the determination module determines that the type of the neighbor cell is a LTE macrocell and to hand over the user equipment to a neighbor WCDMA macrocell base station when the determination module determines that the type of the neighbor cell is a LTE femtocell.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
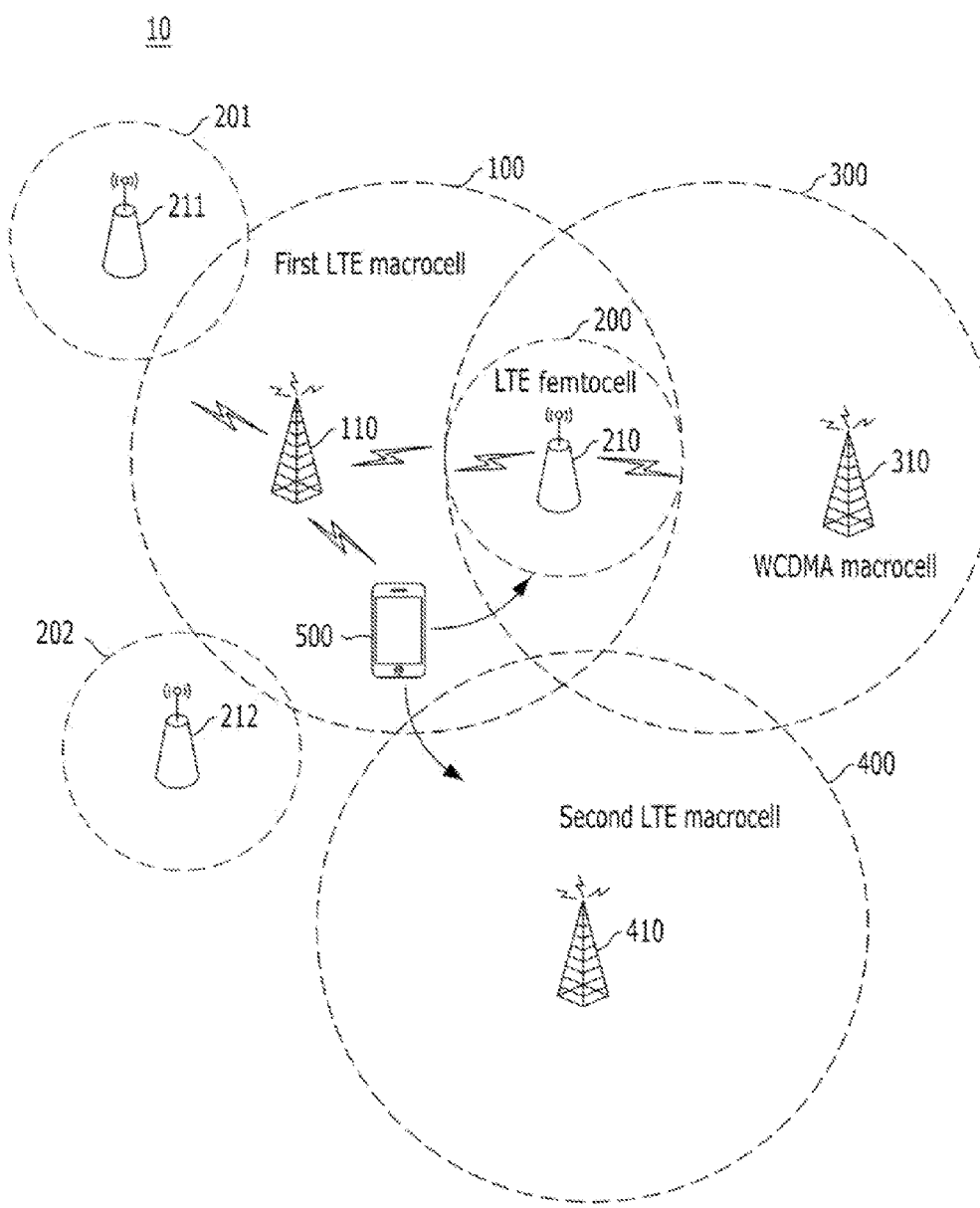
FIG. 1 shows a long term evolution (LTE) communication network in accordance with embodiments of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In embodiments of the present invention, handover may be controlled in a LTE communication network according to a type of a target base station. Particularly, when user equipment enters into a neighbor cell while receiving an associated service from a LTE macrocell base station, LTE macrocell base station may determine a type of the entered neighbor cell and perform a handover procedure differently according to the determined type of the entered neighbor cell in accordance with embodiments of the present invention. For example, LTE macrocell base station may determine whether the entered neighbor cell is a LTE macrocell or a LTE small cell based on a measurement report received from user equipment in accordance with embodiments of the present invention. The LTE small cell may include a LTE microcell, a LTE picocell, and/or a LTE femtocell. When the entered cell is a LTE small cell, user equipment may not accurately detect a location of a LTE small cell base station due to the shortage in PCIs. Accordingly, when LTE macrocell base station determines that the newly entered neighbor, cell is the LTE small cell, LTE macrocell base station may hand over user equipment to a neighbor WCDMA macrocell, instead of the LTE small cell base station in accordance with embodiments of the present invention.

For convenience and ease of understanding, LTE small cells and LTE small cell base stations may be described as LTE femtocells and LTE femtocell base stations, hereinafter. The present invention, however, is not limited thereto. For example, LTE small cells and LTE small cell base stations may denote LTE microcells and LTE microcell base stations or LTE picocells and LTE picocell base stations. Hereinafter, a LTE communication network will be described with reference to FIG. 1.

FIG. 1 shows a LTE communication network in accordance with embodiments of the present invention.

Referring to FIG. 1, LTE communication network 10 may include first LTE macrocell 100, a plurality of LTE femtocells 200, 201, and 202, and second LTE macrocell 400. LTE communication network 10 may be implemented over typical $3^{rd}$ generation communication network such as a WCDMA communication network, as described above. Accordingly, as shown in FIG. 1, LTE communication network 10 may include an overlap of first and second LTE macrocells 100 and 400 with WCDMA macrocell 300. For convenience and ease of understanding, only one WCDMA macrocell 300 is illustrated in FIG. 1. However, a plurality of WCDMA macrocells may overlap with first and second LTE macrocells 100 and 400.

As shown in FIG. 1, WCDMA macrocell 300 may overlap with first and second LTE macrocells 100 and 400. WCDMA macrocell 300 may provide a WCDMA communication service to user equipment 500 through WCDMA macrocell base station 310 when user equipment 500 is located within a service area thereof. WCDMA macrocell base station 310 may be an access point to a wireless communication system. WCDMA macrocell base station 310 may manage radio resources associated with WCDMA macrocell 300.

First and second LTE macrocells 100 and 400 may provide a LTE communication service to user equipment 500 through first and second LTE macrocell base stations 110 and 410, respectively, when user equipment 500 is located within a service area thereof. First and second LTE macrocell base stations 110 and 410 may be an accessing point to a wireless communication system. First and second LTE macrocell base stations 110 and 410 may manage radio resources associated with first and second LTE macrocells 110 and 410.

As described above, LTE communication network 10 may include a plurality of LTE femtocells 200, 201, and 202. LTE femtocells 200, 201, and 202 may be located within service coverage of LTE macrocell base stations 110 and 410 and/or WCDMA macrocell base station 310. For example, LTE femtocells 200, 201, and 202 may be installed to guarantee a certain level of service quality in a shadow area or a boundary area where an associated signal deteriorates. Furthermore, LTE femtocells 200, 201, and 202 may be installed to distribute a processing load of a LTE macrocell base station. For example, LTE femtocell 200 may be installed to distribute a processing load of first LTE macrocell base station 110.

In general, a LTE communication system may use a comparatively wide frequency bandwidth. Accordingly, it may be very difficult to set up a frequency of first and second LTE macrocell base stations 110 and 410 differently from that of LTE femtocell base stations 210, 211, and 212. In accordance with embodiments of the present invention, it is assumed that first and second LTE macrocell base stations 110 and 410 may use a frequency identical to that of LTE femtocell base stations 210, 211, and 212.

In such LTE communication network 10, user equipment 500 may receive a communication service through at least one of first and second LTE macrocells 100 and 400 and LTE femtocells 200, 201, and 202. When user equipment 500 may move from one cell to the other, a handover procedure may be controlled according to a type of a target base station to handover. In order to determine a type of a target base station, PCIs may be grouped into a LTE macrocell PCI group and a LTE femtocell PCI group in accordance with embodiments of the present invention. Accordingly, one of the PCIs included in the LTE macrocell PCI group may be assigned to a LTE macrocell base station, and one of the PCIs included in the LTE femtocell PCI group may be assigned to a LTE femtocell base station. With a PCI assigned to a base station, a type of the base station can be determined as one of a LTE macrocell base station and a LTE femtocell base station. Such PCI grouping will be described with reference to FIG. 2.

Figure 2:
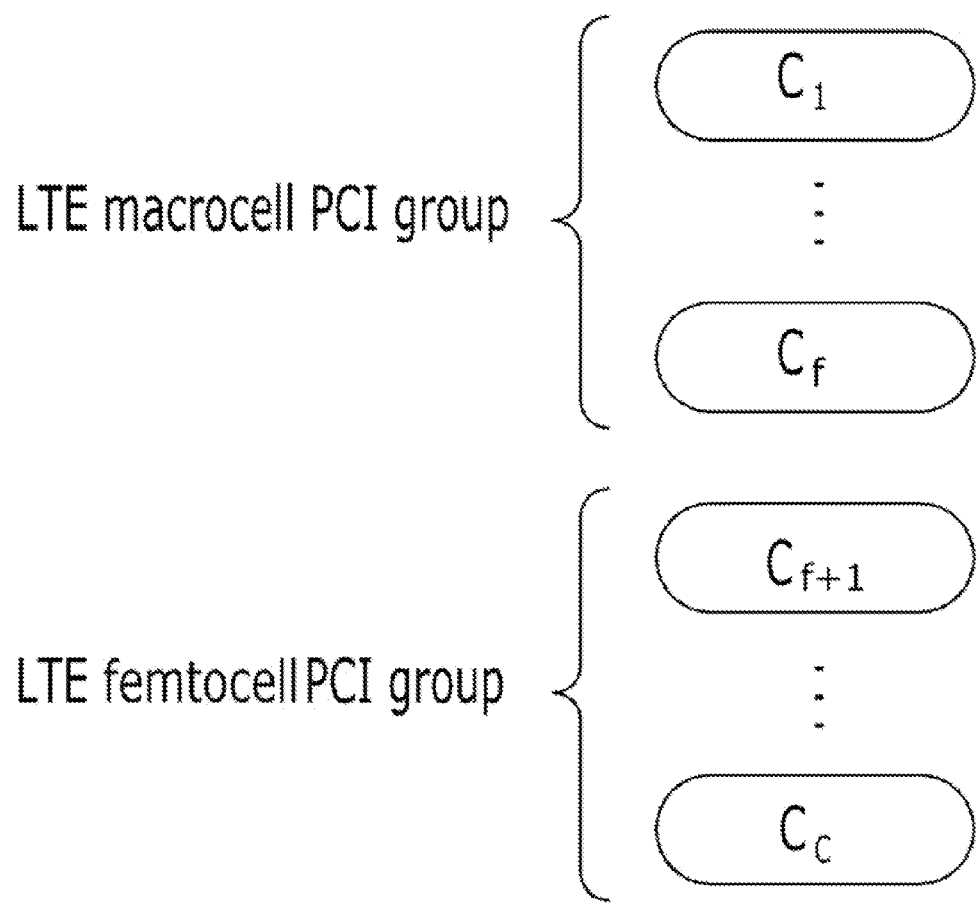
FIG. 2 shows physical cell identities (PCIs) grouped into a LTE macrocell PCI group and a LTE femtocell PCI group in accordance with embodiments of the present invention.

FIG. 2 shows physical cell identities (PCIs) grouped into a LTE macrocell PCI group and a LTE femtocell PCI group in accordance with embodiments of the present invention.

Referring to FIG. 2, PCIs $C_1$ to $C_f$ may be grouped into a LTE macrocell PCI group and PCIs $C_{f+1}$ to Cc may be grouped into a LTE femtocell PCI group in accordance with embodiments of the present invention. "f" and "c" may denote an integer number greater than 0. Furthermore, a PCI included in the LTE macrocell PCI group may be referred to as a LTE macrocell PCI and a PCI included in the LTE femtocell PCI group may be referred to as a LTE femtocell PCI. LTE macrocell PCIs may be assigned to LTE macrocell base stations and LTE femtocell PCIs may be assigned to LTE femtocell base stations in accordance with embodiments of the present invention. Accordingly, a type of LTE cell may be identified based on a PCI assigned thereto.

The present invention, however, is not limited thereto. Such grouped PCI may not be required to be used in accordance with embodiments of the present invention. PCIs may be used without grouping into a LTE macrocell PCI group and a LTE femtocell PCI group. In this case, LTE macrocell base stations located around a LTE femtocell base station may be required to modify a neighbor list additionally and frequently in order to indicate that a neighbor cell is a LTE macrocell or a LTE femtocell.

In accordance with embodiments of the present invention, first and second LTE macrocell base stations 100 and 400 may add information on the LTE femtocell PCI group in a neighbor list and manage the neighbor list with the LTE femtocell PCI group. First and second LTE macrocell base stations 100 and 400 may also transmit the neighbor list with the LTE femtocell PCI group information to user equipment 500.

Such a neighbor list with the LTE femtocell PCI group information may be transmitted through a broadcast signal or a measurement control message. For example, first and second LTE macrocell base stations 110 and 410 may broadcast a broadcast signal to user equipment 500 in an idle state or transmit a measurement control message to user equipment 500 in a traffic state. Using the broadcast signal and the measurement control message, LTE femtocell PCI group information may be transmitted to user equipment 500.

User equipment 500 may enter, from first LTE macrocell 100, into LTE femtocell 200 using the same frequency of first LTE macrocell 100 while receiving a communication service from first LTE macrocell base station 110. In this case, user equipment 500 may measure signal intensity and signal quality of LTE femtocell base stations included in the neighbor list and transmit a measurement report as the result of the measurement to first LTE macrocell base station 110. The measurement report may include a PCI of LTE femtocell base station 210.

First LTE macrocell base station 110 may receive the measurement report from user equipment 500 and determine a type of a cell that user equipment 500 enters into based on the measurement report. Then, first LTE macrocell base station 110 may perform a handover procedure according to the determined type of the target cell that user equipment 500 enters into in accordance with embodiments of the present invention. For example, based on the determination result, first LTE macrocell base station 110 may detect that user equipment 500 enters into LTE femtocell base station 200. If a handover procedure is performed to handover user equipment 500 to LTE femtocell base station 200, such handover procedure may fail due to the shortage in PCIs but cause frequency interference. Accordingly, first LTE macrocell base station 110 may control user equipment 500 to be handed over to WCDMA macrocell base station 310 instead of LTE femtocell base station 210 in accordance with embodiments of the present invention. That is, when first LTE macrocell base station 110 may detect a LTE femtocell PCI in the received measurement report, first LTE macrocell base station 110 may control user equipment 500 handover to WCDMA macrocell base station 310. Hereinafter, such a handover method in accordance with embodiments of the present invention will be described with reference to FIG. 3 and FIG. 4.

Figure 3:
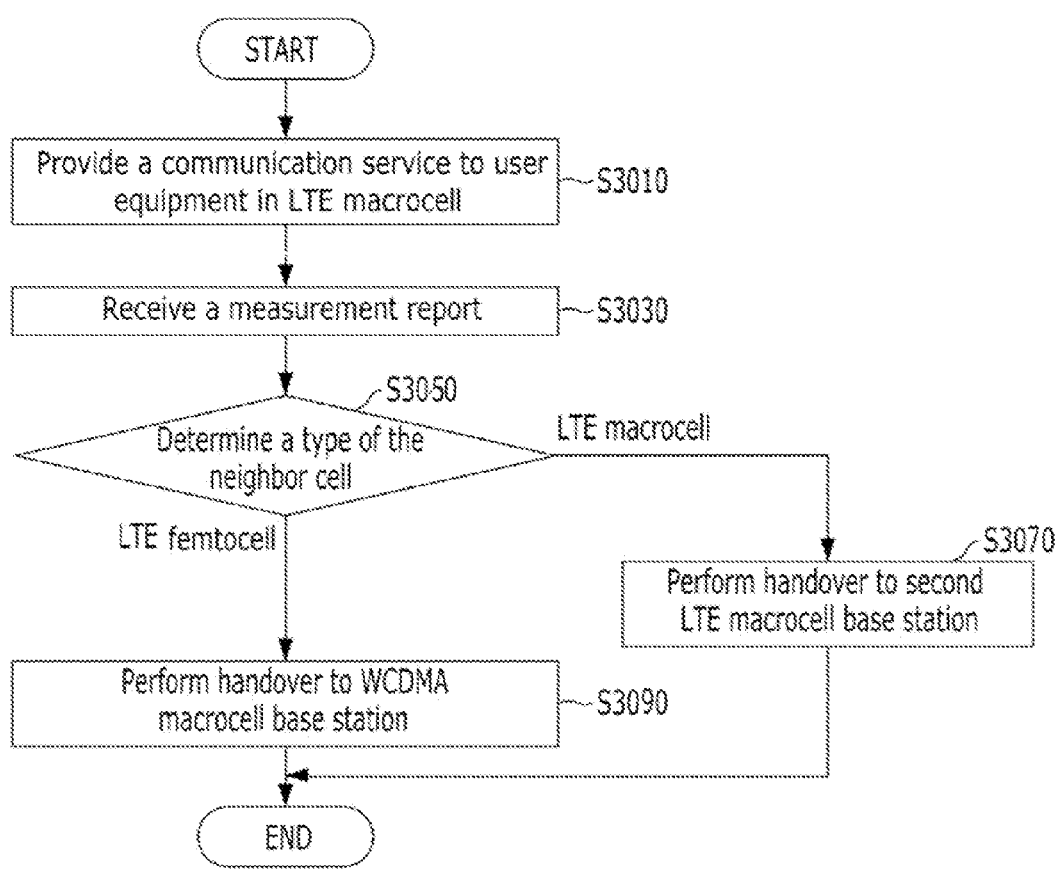
FIG. 3 shows a method of handover in a LTE communication network in accordance with embodiments of the present invention.

FIG. 3 shows a method of handover in a LTE communication network in accordance with embodiments of the present invention.

Referring to FIG. 3, a communication service may be provided to user equipment 500 located in first LTE macrocell 100 through first LTE macrocell base station 110 at step S3010. For example, when user equipment 500 in first LTE macrocell 100 tries to receive a communication service, user equipment 500 may establish a radio communication link to first LTE macrocell base station 110 and receive a communication service from first LTE macrocell base station 110. In this case, user equipment 500 may transition to a traffic state with first LTE macrocell base station 110. User equipment 500 may move from first LTE macrocell 100 to a neighbor cell while receiving the communication service from first LTE macrocell base station 110. For example, user equipment 500 in the traffic state may enter into LTE femtocell 200 or second LTE macrocell 400.

At step S3030, a measurement report may be received. When user equipment 500 enters a neighbor cell, user equipment 500 may measure signal intensity and signal quality of the entered neighbor cell in a neighbor list and transmit a measurement report, as the result of the measurement, to first LTE macrocell base station 110. User equipment 500 may measure signal intensities and signal qualities of other neighbor cells in the neighbor list received from first LTE macrocell base station 110 and transmit the measurement results thereof through the measurement report. For example, user equipment 500 may measure signal intensity and signal quality of at least one of LTE femtocell base station 210 and second LTE macrocell base station 410, which is in a neighbor list of first LTE macrocell base station 110. As a result of the measurement, user equipment 500 may transmit the measurement report to first LTE macrocell base station 110. The measurement report may include an identification code of the entered neighbor cell, and/or other identification codes of other neighbor cells. For example, the measurement report may include a PCI of at least one of LTE femtocell base station 210 and second LTE macrocell base station 410. That is, the measurement report may include a LTE femtocell PCI of LTE femtocell base station 210 and/or a LTE macrocell PCI of second LTE macrocell base station 410.

At step S3050, a type of the entered neighbor cell may be determined. For example, second LTE macrocell base station 410 may be assigned with a LTE macrocell PCI, which is a PCI included in a LTE macrocell PCI group. LTE femtocell 200 may be assigned with a LTE femtocell PCI, which is a PCI included in a LTE femtocell PCI group. Accordingly, based on the PCI of each base station included in the measurement report, first LTE macrocell base station 110 may determine a type of the entered neighbor cell. First LTE macrocell base station 110 may receive the measurement report from user equipment 500 and analyze the received measurement report whether the measurement report includes a LTE femtocell PCI or not.

When a type of the entered neighbor cell is a LTE macrocell (LTE macrocell—S3050), user equipment 500 may be controlled so as to perform handover to the entered LTE macrocell at step S3070. For example, first LTE macrocell base station 110 may determine that a type of the entered cell is a LTE macrocell when the received measurement report includes a LTE macrocell PCI. In this case, when the signal intensity of the entered LTE macrocell is greater than predetermined signal intensity, first LTE macrocell base station 110 may handover user equipment 500 from first LTE macrocell 100 to second LTE macrocell 400 which is corresponding to the LTE macrocell PCI included in the measurement report.

When a type of the entered neighbor cell is a LTE femtocell (LTE femtocell—S3050), user equipment 500 may be controlled to handover to a neighbor WCDMA macrocell, instead of the entered LTE femtocell at step S3090. For example, first LTE macrocell base station 110 may determine that a type of the entered cell is a LTE femtocell when the received measurement report includes a LTE femtocell PCI. In this case, first LTE macrocell base station 110 may handover user equipment 500 from first LTE macrocell 100 to WCDMA macrocell 300 which may overlap with LTE femtocell 200 or near to LTE femtocell 200. As described above, a LTE communication network may be implemented over a WCDMA communication network. Accordingly, a WCDMA macrocell may be available where a LTE femtocell and/or a LTE macrocell are available. If user equipment 500 is handed over from first LTE macrocell 100 to LTE femtocell 20, such a handover procedure may not be completed due to the shortage in PCIs. Such handover problem may lead various problems such as frequency interference, service quality deterioration, power increment and cell capacity decrement in LTE macrocell base stations, and uplink coverage shrinkage in LTE femtocell base stations. Accordingly, first LTE macrocell base station 110 may perform handover of user equipment 500 to WCDMA macrocell base station 310 although user equipment 500 enters into LTE femtocell 200 in order to prevent the above mentioned problems. Hereinafter, such a handover operation for LTE femtocell will be described with reference to FIG. 4.

Figure 4:
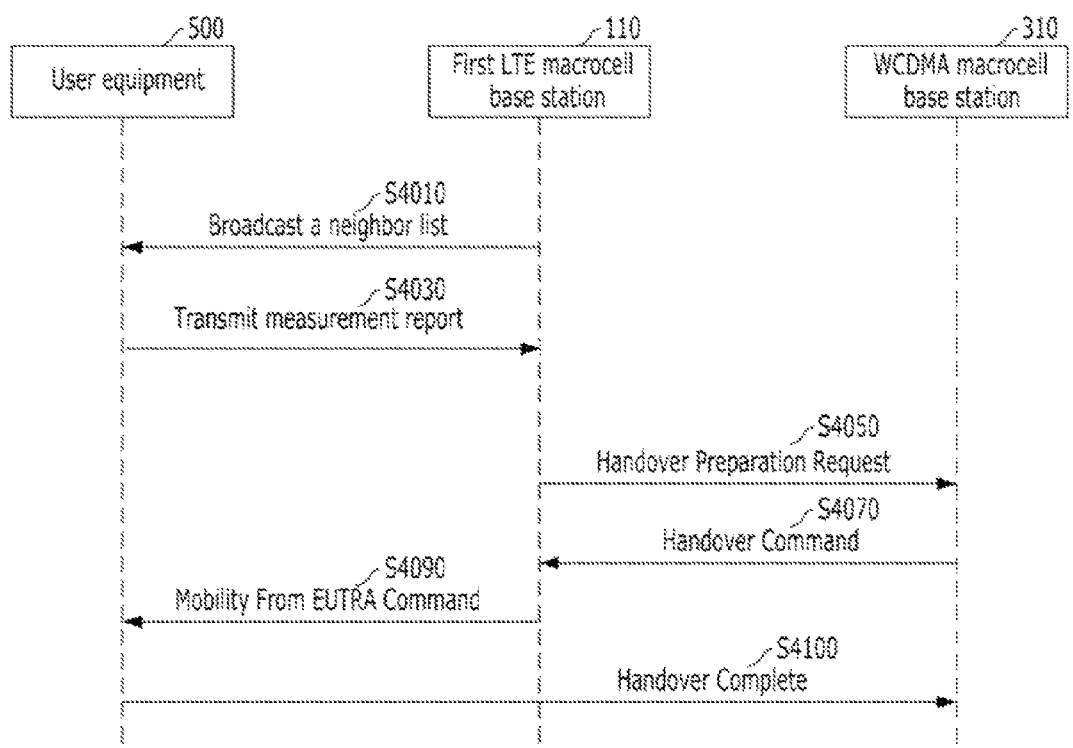
FIG. 4 shows signal flows in a handover procedure when user equipment enters into a LTE femtocell from a LTE macrocell in accordance with embodiments of the present invention.

FIG. 4 shows signal flows in a handover procedure when user equipment enters into a LTE femtocell from a LTE macrocell in accordance with embodiments of the present invention. That is, FIG. 4 shows signal flows in a handover procedure from a LTE macrocell to a WCDMA macrocell, which is performed when user equipment enters into a LTE femtocell from a LTE macrocell, in accordance with embodiment of the present invention.

Referring to FIG. 4, first LTE macrocell base station 110 may transmit a neighbor list to user equipment 500 through a broadcasting signal when user equipment 500 is in an idle state at step S4010. The neighbor list may include information on neighbor base stations, such as an identification code, such as a PCI, of LTE femtocell base station 210. Such a neighbor list may be included in a system information block (SIB) 11 of the broadcasting signal.

When the signal intensity of LTE femtocell base station 210 becomes greater than a predetermined threshold after user equipment 500 may enter into LTE femtocell 200 from first LTE macrocell 100, user equipment 500 may register a PCI of LTE femtocell base station 210 into an active set and transmit a measurement report to first LTE macrocell base station 110 at step S4030.

First LTE macrocell base station 110 may receive the measurement report from user equipment 500. First LTE macrocell base station 110 may determine whether the received measurement report includes a LTE femtocell PCI. When first LTE macrocell base station 110 determines that the received measurement report includes the LTE femtocell PCI, first LTE macrocell base station 110 may transmit a Handover Preparation Request message to a radio network controller (RNC) of WCDMA macrocell base station 210 through a mobility management entity (MME) in order to prepare a handover procedure to WCDMA base station 310 at step S4050. The RNC of WCDMA macrocell base station 210 may prepare allocation of radio resources for handover. After completion of the handover preparation, WCDMA macrocell base station 310 may transmit a handover command to first LTE macrocell base station 110 at step S4070.

In response to the handover command from WCDMA macrocell base station 310, first LTE macrocell base station 110 may transmit a handover command to user equipment 500 at step S4090. For example, the handover command may be a Mobility from UETRA Command. User equipment 500 may perform and complete handover to WCDMA macrocell base station 210, and user equipment 500 may transmit a Handover Complete message to WCDMA macrocell base station 310 at step S4100. That is, first LTE macrocell base station 110 may not hand over user equipment 500 to LTE femtocell base station 210 although user equipment 500 enters into LTE femtocell 200 in accordance with embodiments of the present invention. In this way, first LTE macrocell base station 110 may avoid the problems, such as frequency interference, caused by handover failure to LTE femtocell base station. Hereinafter, an apparatus of controlling a handover procedure in a LTE communication network in accordance with embodiments of the present invention will be described with reference to FIG. 5.

Figure 5:
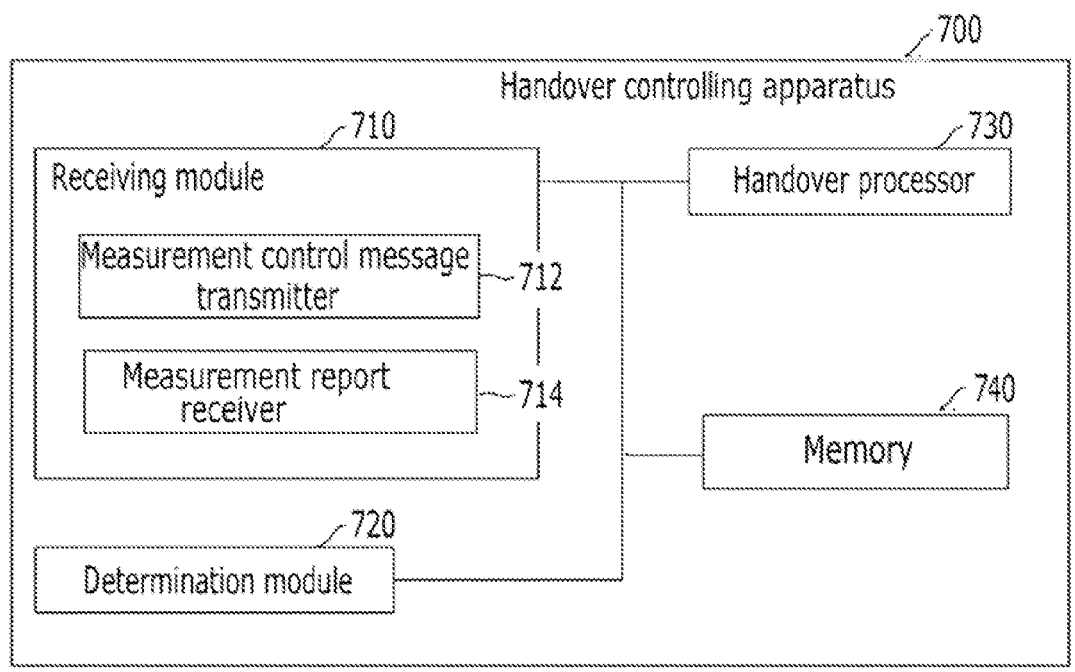
FIG. 5 shows an apparatus of controlling a handover procedure in a LTE communication network in accordance with embodiments of the present invention.

FIG. 5 shows an apparatus of controlling a handover procedure in a LTE communication network in accordance with embodiments of the present invention.

Referring to FIG. 5, handover controlling apparatus 700 may include receiving module 710, determination module 720, handover processor 730, and memory 740. Although handover controller apparatus 700 is illustrated as an independent device, handover controller apparatus 700 may be equipped in LTE macrocell base stations, for example, first and second LTE macrocell base stations 210 and 410.

Receiving module 710 may receive various types of messages including an event message from user equipment 500. In order to receive such messages, receiving module 710 may include measurement control message transmitter 712 and measurement report receiver 714.

Measurement control message transmitter 712 may transmit a measurement control message to user equipment 500 in order to control user equipment 500 to report radio environments around user equipment 500. In response to the measurement control message, user equipment 500 may measure signal intensity and signal quality of neighbor cells and report the measurement result to handover controller 700. Measurement report receiver 714 may receive a measurement report message from user equipment 500 in response to the measurement control message. As described above, the measurement report message may include signal intensities and signal qualities of neighbor cells, measured by user equipment 500.

Furthermore, measurement control message transmitter 712 may transmit a neighbor list to user equipment 500. The neighbor list may be included in the measurement control message. The neighbor list may include identification codes of neighbor cell base stations. For example, identification codes of neighbor cell base stations may be a PCI. Measurement control message transmitter 712 may broadcast a broadcasting signal with the neighbor list when user equipment 500 is in an idle state.

Handover controlling apparatus 700 may further include memory 740 for storing information on LTE macrocell PCIs and LTE femtocell PCIs. The LTE macrocell PCIs may be a PCI assigned to LTE macrocell base stations and LTE femtocell PCIs may be a PCI assigned to LTE femtocell base station in accordance with embodiments of the present invention.

Determination module 720 may determine a type of a neighbor cell that user equipment 500 enters. Determination module 720 may analyze the measurement report, which is received through receiving module 710. Based on the analysis result, determination module 720 may determine whether the received measurement report includes LTE femtocell PCI or not. When the received measurement report includes LTE femtocell PCI, determination module 720 may determine that user equipment 500 performed handedover WCDMA macrocell base station 310. When the received measurement report excludes LTE femtocell PCI, determination module 720 may hand over user equipment 500 to second LTE macrocell base station 410 corresponding to a LTE macrocell PCI included in the measurement report. Determination module 720 may refer to the LTE femtocell PIC information stored in memory 740.

Handover processor 730 may perform handover based on the determination result of determination module 720. For example, when determination module 720 determines to perform handover of user equipment 500 to second LTE macrocell base station 410, handover processor 730 may control second LTE macrocell base station 410 to perform a handover preparation procedure through a mobility management entity (MME). After second LTE macrocell base station 410 completes the handover preparation procedure, handover processor 730 may transmit a handover command to user equipment 500 to perform handover of user equipment 500 to second LTE macrocell base station 410.

When determination module 720 determines to hand over user equipment 500 to WCDMA macrocell base station 310, handover processor 730 may perform a handover preparation procedure with a radio network controller (RNC) of WCDMA macrocell base station 310 through a MME. After completion of the handover preparation procedure, handover processor 720 may transmit a handover command to user equipment 500.

As described above, handover controller 700 may hand over user equipment 500 to WCDMA macrocell base station 310 when user equipment 500 enters into LTE femtocell 200 from first LTE macrocell base station 110. Accordingly, the problems caused by handover failure, such as frequency interference, may be prevented when user equipment 500 enters into LTE femtocells in accordance with embodiments of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of handover in a long term evolution (LTE) communication network including LTE macrocells and LTE femtocells and overlapping with at least one wideband code division multiple access (WCDMA) macrocell, the method in the LTE macrocell base station, comprising:
   receiving a measurement report from user equipment while providing a communication service to the user equipment located within a service area of the LTE macrocell base station;
   determining whether a neighbor cell which the user equipment enters is a LTE macrocell or a LTE femtocell based on the measurement report, wherein the LTE femtocell is overlapped with a neighbor WCDMA macrocell; and
   performing handover of the user equipment to a base station of the neighbor WCDMA macrocell when (i) the neighbor cell is determined as the LTE femtocell and (ii) a base station of the LTE femtocell uses a same frequency as the LTE macrocell base station corresponding to a current serving base station.

2. The method of claim 1, wherein the determining includes:
   determining whether the received measurement report includes a LTE macrocell identification code or a LTE femtocell identification code;
   determining that the neighbor cell is the LTE macrocell when the received measurement report includes the LTE macrocell identification code; and
   determining that the neighbor cell is the LTE femtocell when the received measurement report includes the LTE femtocell identification code.

3. The method of claim 2, wherein:
   the LTE macrocell identification code is an identification code associated only with a LTE macrocell base station; and
   the LTE femtocell identification code is an identification code associated only with a LTE femtocell base station.

4. The method of claim 2, comprising:
   performing handover of the user equipment to a neighbor LTE macrocell base station when the neighbor cell is determined as the LTE macrocell.

5. The method of claim 1, wherein, prior to the receiving, comprising:
   storing information on LTE macrocell identification codes and LTE femtocell identification codes in a memory; and
   transmitting the stored information to the user equipment with a neighbor list through at least one of a broadcasting signal and a measurement control signal.

6. A method of handover in a long term evolution (LTE) communication network including LTE macrocell base stations and LTE femtocell base stations and overlapping with a wideband code division multiple access (WCDMA) macrocell base station, the method in a first LTE macrocell base station comprising;
   providing a communication service to user equipment located in a service area of the first LTE macrocell base station;
   receiving a measurement report from the user equipment when the user equipment enters a neighbor cell;
   determining a type of the neighbor cell based on the measurement report; and
   controlling handover of the user equipment based on the determination result,
   wherein the controlling includes:
      enabling handover of the user equipment to the WCDMA macrocell base station when (i) the type of the neighbor cell is a LTE femtocell and (ii) a base station of the LTE femtocell uses a same frequency as the first LTE macrocell base station corresponding to a current serving base station; and
   wherein the LTE femtocell is overlapped with a corresponding WCDMA macrocell of the WCDMA macrocell base station.

7. The method of claim 6, wherein the determining a type of the neighbor cell includes:
   determining the type of the neighbor cell based on a physical cell identity (PCI) of the neighbor cell, which is included in the measurement report.

8. The method of claim 6, wherein the determining a type of the neighbor cell includes:
   determining that the type of the neighbor cell is a LTE macrocell when the measurement report includes a LTE macrocell base station PCI; and
   determining that the type of the neighbor cell is the LTE femtocell when the measurement report includes a LTE femtocell base station PCI.

9. The method of claim 8, wherein the LTE macrocell base station PCI is included in PCIs of a LTE macrocell PCI group and the LTE femtocell base station PCI is included in PCIs of a LTE femtocell PCI group.

10. The method of claim 9, comprising:
   grouping the PCIs into the LTE macrocell PCI group and the LTE femtocell PCI group;
   assigning PCIs of the LTE macrocell PCI group only to LTE macrocell base stations; and
   assigning PCIs of the LTE femtocell PCI group only to LTE femtocell base station.

11. The method of claim 6, wherein the controlling handover includes:
   enabling handover of the user equipment to a second LTE macrocell base station when the type of the neighbor cell is a LTE macrocell.

12. The method of claim 6, wherein the receiving a measurement report from the user equipment includes:
   measuring, by the user equipment, signal intensity of the neighbor cell when the user equipment enters the neighbor cell;
   including, by the user equipment, a PCI of the neighbor cell into the measuring report with the measurement result; and
   transmitting, by the user equipment, the measurement report to the LTE macrocell base station.

13. The method of claim 12, comprising:
   transmitting a neighbor list to the user equipment,
   wherein the neighbor list includes information on a LTE macrocell PCI group and a LTE femtocell PCI group to the user equipment.

14. The method of claim 13, wherein the neighbor list with the information is transmitted to the user equipment through at least one of a broadcasting signal and a measurement control message.

15. An apparatus for providing handover in a long term evolution (LTE) communication network, the apparatus comprising:
   a receiving processor configured to receive a measurement report from user equipment while the user equipment receives a communication service from an associated LTE macrocell base station;
   a determination processor configured to determine a type of a neighbor cell that the user equipment enters into; and a handover processor configured to:
  (i) initiate handover of the user equipment to a neighbor LTE macrocell base station when the determination processor determines that the type of the neighbor cell is a LTE macrocell; and
  (ii) initiate handover of the user equipment to a neighbor WCDMA macrocell base station when the determination processor determines that the type of the neighbor cell is a LTE femtocell and a base station of the LTE femtocell uses a same frequency as the associated LTE macrocell base station corresponding to a current serving base station,
wherein the LTE femtocell is overlapped with a corresponding WCDMA macrocell of the neighbor WCDMA macrocell base station.

16. The apparatus of claim 15, wherein the receiving processor includes:
  a measurement control message transmitter configured to transmit a measurement control message to the user equipment; and
  a measurement report receiver configured to receive the measurement report from the user equipment in response to the measurement control message.

17. The apparatus of claim 16, wherein:
  the measurement control message includes a neighbor list that contains physical cell identities of neighbor cell base stations; and
  the measurement control message transmitter transmits the measurement control message with the neighbor list through a broadcasting signal.

18. The apparatus of claim 16, further comprising:
  a memory configured to store information on LTE macrocell PCIs and LTE femtocell PCIs,
  wherein the LTE macrocell PCIs are assigned only to LTE macrocell base stations and the LTE femtocell PCIs are assigned only to LTE femtocell base stations.

19. The apparatus of claim 16, wherein the determination processor is configured to:
  determine the type of the neighbor cell is the LTE macrocell when the measurement report includes a LTE macrocell PCI; and
  determine the type of the neighbor cell is the LTE femtocell when the measurement report includes a LTE femtocell PCI.

* * * * *

UNITED STATES PATENT AND TRADEMARK OFFICE
CERTIFICATE OF CORRECTION

PATENT NO. : 9,055,498 B2  
APPLICATION NO. : 13/553160  
DATED : June 9, 2015  
INVENTOR(S) : Tae-Won Ban et al.

Page 1 of 1

It is certified that error appears in the above-identified patent and that said Letters Patent is hereby corrected as shown below:

On the Title Page, item (30) Foreign Application Priority Data section should be added under item (65) Prior Publication Data section as follows:

--(30) Foreign Application Priority Data  
   Jul. 19, 2011 (KR) .................. 10-2011-0071535--

Signed and Sealed this  
Third Day of November, 2015

Michelle K. Lee  
*Director of the United States Patent and Trademark Office*